United States Patent
Yoshida et al.

(10) Patent No.: US 6,861,468 B2
(45) Date of Patent: Mar. 1, 2005

(54) POLYESTER RESIN COMPOSITION

(75) Inventors: Tetsuya Yoshida, Shizuoka-ken (JP); Yukio Shirokura, Shizuoka-ken (JP); Tadahiro Kegasawa, Shizuoka-ken (JP); Masami Okamoto, Shiga-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/670,558

(22) Filed: Sep. 26, 2003

(65) Prior Publication Data

US 2004/0092641 A1 May 13, 2004

(30) Foreign Application Priority Data

Sep. 27, 2002 (JP) ........................................ 2002-283409
Sep. 22, 2003 (JP) ........................................ 2003-330086

(51) Int. Cl.$^7$ ............................................. C08L 67/02
(52) U.S. Cl. ....................... 524/599; 524/445; 524/447; 524/601; 524/602; 524/603; 524/605; 524/606; 523/210; 525/419; 525/425; 525/437; 528/288; 528/290; 528/293; 528/295; 528/302; 528/308.1; 528/308.6
(58) Field of Search .......................... 523/210; 524/445, 524/447, 601, 602, 603, 606; 525/419, 425, 437; 528/288, 290, 293, 295, 302, 308, 308.1, 308.6

(56) References Cited

U.S. PATENT DOCUMENTS

| | | | |
|---|---|---|---|
| 4,708,975 A | 11/1987 | Shain | |
| 6,162,857 A | 12/2000 | Trexler, Jr. et al. | |
| 2002/0086953 A1 | 7/2002 | Williams et al. | |

FOREIGN PATENT DOCUMENTS

| | | | |
|---|---|---|---|
| DE | 199 43 774 | | 3/2001 |
| JP | 62-74957 A | | 4/1987 |
| JP | 3-62846 A | | 3/1991 |
| JP | 6-56975 A | | 3/1994 |
| JP | 8-53572 A | | 2/1996 |
| JP | 11-1605 A | | 1/1999 |
| JP | 11-130951 A | | 5/1999 |
| JP | 2000-53847 A | | 2/2000 |
| JP | 200-86232 A | | 3/2000 |
| JP | 2000086232 | | 3/2000 |
| JP | 2000-327805 A | | 11/2000 |
| JP | 2001-323143 A | | 11/2001 |
| JP | 2001-323144 A | | 11/2001 |
| JP | 2001-323145 A | | 11/2001 |
| JP | 2001-329150 A | | 11/2001 |
| JP | 2002-82236 A | | 3/2002 |
| JP | 2002088236 A | * 3/2002 | ........... C08L/67/02 |
| WO | WO 01/19909 | | 3/2001 |

* cited by examiner

Primary Examiner—Margaret G. Moore
Assistant Examiner—Marc S. Zimmer
(74) Attorney, Agent, or Firm—Sughrue Mion, PLLC

(57) ABSTRACT

A polyester resin composition containing a thermoplastic polyester resin; a polyester copolymer containing a monomer having at least one of an amino group, an imino group, an amido group, and a sulfonic acid group; a layered silicate; and an antioxidant. The monomer having at least one of an amino group, an imino group, an amido group, and a sulfonic acid group is contained in the polyester copolymer in an amount of 5 to 15 mol %. The monomer having at least one of an amino group, an imino group, an amido group, and a sulfonic acid group is contained in the polyester resin composition in an amount of 1 to 5 mol % based on a total polyester content of the polyester resin composition. The antioxidant is contained in the polyester resin composition in an amount of 0.01% to 1.0% by mass.

15 Claims, No Drawings

POLYESTER RESIN COMPOSITION

CROSS-REFERENCE TO RELATED APPLICATION

This application claims priority under 35USC 119 from Japanese Patent Application Nos. 2002-283409 and 2003-330086, the disclosure of which is incorporated by reference herein.

BACKGROUND OF THE INVENTION

1. Field of the Invention

The present invention relates to a polyester resin composition and specifically to a polyester resin composition prepared by highly dispersing a layered silicate and excellent in strength, heat resistance, barrier properties, and the like.

2. Description of the Related Art

Thermoplastic polyester resins represented by polyethylene terephthalate (PET), polybutylene terephthalate (PBT), or polyethylene naphthalate (PEN) have excellent mechanical strength, heat resistance, and molding processability and therefore are used for a wide variety of purposes such as moldings, films, and fibers.

A variety of resin compositions are known in which reinforcing fibers such as glass fiber and carbon fiber or inorganic fillers such as calcium carbonate, clay minerals, and mica are incorporated in these thermoplastic polyester resins and, then kneaded to be reinforced from the viewpoint of promoting a further improvement in the mechanical strength (mechanical characteristics) and heat resistance. However, a problem introduced by these inorganic materials is that a sufficient improvement in the mechanical strength and heat resistance cannot be achieved since the materials are difficult to form finely divided particles and disperse uniformly by simple mixing and kneading. For example, JP-A No.6-56975 discloses a resin composition prepared by dispersing kaolin or talc into a PET-PEN copolymer resin, and this resin composition also encounters a similar problem. Particularly, when resistance to thermal decomposition is not sufficient, the polyester itself undergoes hydrolysis during high-temperature processing and fails to give substantially moldings or films having good appearance and physical properties. An attempt to add a large amount of the inorganic materials in order to improve further the mechanical strength and heat resistance results in an increase in specific gravity and deterioration in processability.

In recent years as a technique for solving the above problem, a variety of composite materials have been proposed which are improved in the heat resistance and mechanical characteristics by dispersing a small amount of a layered silicate on a molecular level in a polyester resin. For example, JP-A No.62-74957 discloses a composite material prepared by dispersing uniformly a sheet clay mineral into a polyamide and having excellent strength, stiffness, and heat resistance. Use of a small amount of the sheet clay mineral surely enables a significant improvement in the mechanical strength and heat resistance, but in the case of the polyester resin, a composite material in which the sheet clay mineral is uniformly dispersed cannot be obtained like the case of the polyamide by the method disclosed in the above document. With relation to this technique, a further technique for improving dispersibility of the sheet clay mineral with the aid of a compatibilizing agent is also disclosed. However, only moldings which are small in the effects of improving the mechanical strength and heat resistance and large in deterioration in toughness are obtained (For example, see JP-A No.3-62846).

Furthermore, for example, JP-A No.8-53572 discloses a resin composition in which a layered silicate having an unreacted compound among the sheets is dispersed in a polymer. However, when a polyester resin is used as a matrix resin, the polyester resin is subject to hydrolysis because the resin is exposed to high temperatures during molding processing and cannot give moldings and films having good appearance and physical properties.

Furthermore, for example, JP-A No. 11-130951 discloses a polyester composite material containing a layered silicate organized with a phosphonium salt, stating that the mechanical strength and heat resistance can be improved. The composite material can surely be prevented from coloring stemming from the thermal decomposition of the organizing agent itself to maintain a good color tone and simultaneously can be somewhat improved in the mechanical strength and heat resistance. However, since the presence of an organic cation of the organizing agent promotes the hydrolysis of the polyester resin at high temperatures (in molding processing), the mechanical strength and heat resistance of the composite material is deteriorated, failing to give moldings and films practically usable.

This document discloses that the layered silicate can be highly dispersed in the polyester resin by allowing an ionic bond of an organic phosphonium ion to the sheets to give moldings excellent in strength, stiffness, and heat resistance. However, it is impossible to prevent the hydrolysis at high temperatures as described above (For example, see JP-A No.11-1605). Moreover, the compositions and resin films also have a problem in hydrolysis resistance at high temperatures (For example, see JP-A Nos.2000-53847 and 2000-327805).

In addition, techniques for promoting the mechanical properties and heat resistance and improving a balance among physical properties of the polyester resin composition are proposed (For example, see JP-A Nos.2001-323143, 2001-323144, 2001-323145, and 2001-329150). However, all the techniques need complicated steps or a step of treating the surface of a sheet compound with a polyether compound to encounter a problem of causing the productivity to deteriorate.

Furthermore, for example, JP-A No.2000-86232 discloses a polyester resin composition containing a layered silicate in which an aromatic dicarboxylic acid residue having a metal sulfonate group as a substituent is copolymerized in a ratio of 0.01 to 10 mol % of the dicarboxylic acid residue. This reference states that the layered silicate is highly dispersed without losing transparency and gas barrier properties and mechanical strength are improved. However, the document limits the polyester composition to those copolymerized with the aromatic dicaroxylic acid monomer having 5 mol % or less of a metal sulfonate group and moreover does not mention anything as to the necessity of antioxidant.

JP-A No.2002-88236 discloses a polyester composite material in which a polyester copolymer containing 10 mol % or less of an aromatic dicarboxylic acid which has a sulfonic acid group as an acid component is allowed to exist. In a thermoplastic aromatic polyester, a swellable layered silicate is uniformly dispersed at a molecular level. However, this document does not mention the antioxidant and does not disclose a necessary molar ratio of the aromatic dicarboxylic acid component having a sulfonic acid group in the total polyesters of the polyester composite material, either.

SUMMARY OF THE INVENTION

As described above, no polyester resin composition has been provided up to the present, which is prepared by dispersing highly uniformly a layered silicate in a polyester resin matrix and has a good appearance, high barrier properties, particularly a high mechanical strength, and a high heat resistance without undergoing hydrolysis even in high-temperature molding.

The present invention aims at providing a polyester resin composition prepared by dispersing highly uniformly a layered silicate filler of nanometer order. This polyester resin composition has a high strength and a high heat resistance, and does not undergo hydrolysis during a molding process. Moreover, it has a high transparency with low haze, dimensional stability, and good oxygen barrier property.

The above problems are solved by the following aspects of the invention.

A first aspect of the invention is to provide a polyester resin composition containing a thermoplastic polyester resin; a polyester copolymer containing a monomer having at least one of an amino group, an imino group, an amido group, and a sulfonic acid group; a layered silicate; and an antioxidant. The monomer having at least one of an amino group, an imino group, an amido group, and a sulfonic acid group is contained in the polyester copolymer in an amount of 5 to 15 mol %. The monomer having at least one of an amino group, an imino group, an amido group, and a sulfonic acid group is contained in the polyester resin composition in an amount of 1 to 5 mol % based on a total polyester content of the polyester resin composition. The antioxidant is contained in the polyester resin composition in an amount of 0.01% to 1.0% by mass. A second aspect of the invention is to provide the polyester resin composition of the first aspect in which the polyester copolymer contains ethylene terephthalate and/or ethylene naphthalate as a Constituent unit.

A third aspect of the invention is to provide the polyester resin composition of the first or second aspect in which at least one of monomers constituting the polyester copolymer is the same as a monomer constituting the thermoplastic polyester resin.

A fourth aspect of the invention is to provide the polyester resin composition of any one of the first to third aspects in which the content ratio of the polyester copolymer to the layered silicate is from 50% to 500% by mass.

A fifth aspect of the invention is to provide the polyester resin composition of any one of the first to fourth aspects in which the layered silicate is contained in the polyester resin composition in an amount of 0.5% to 30% by mass based on a total mass of the polyester resin composition.

A sixth aspect of the invention is to provide the polyester resin composition of any one of the first to fifth aspects in which the layered silicate is a swellable layered silicate organized by an organizing agent.

DETAILED DESCRIPTION OF THE INVENTION

The polyester resin composition of the present invention contains (1) a thermoplastic polyester resin, (2) a polyester copolymer containing a monomer having, as a functional group, at least one of an amino group, an imino group, an amido group, and a sulfonic acid group, (3) a layered silicate, and (4) an antioxidant. The monomer having, as a functional group, at least one of an amino group, an imino group, an amido group, and a sulfonic acid group is contained in the polyester copolymer of (2) is from 5 to 15 mol %. The monomer having, as a functional group, at least one of an amino group, an imino group, an amido group, and a sulfonic acid group is contained in the polyester resin composition in an amount of 1 to 5 mol % based on a total polyester content of the polyester resin composition. The antioxidant of (4) in the polyester resin composition falls in a range of 0.01% to 1.0% by mass.

When the layered silicate, particularly an organized swellable layered silicate as described later, is kneaded and dispersed in the thermoplastic polyester resin, the invention uses the polyester copolymer containing a monomer having, as a functional group, at least one of an amino group, an imino group, an amido group, and a sulfonic acid group as a compatibilizing agent or a dispersing promoter together with the antioxidant. Thus, the kneading is easily carried out and the dispersion is promoted, and the thermal decomposition or hydrolysis of the polyester resin and the like can be effectively inhibited in molding processing, to obtain a highly uniformly dispersed polyester resin composition.

Major components of the polyester resin composition of the invention are described below in the detail.

(Thermoplastic Polyester Resin)

The thermoplastic polyester resins used in the invention are linear or branched polyester compounds having fluidity on heating, which are usually prepared from a divalent carboxylic acid compound and a divalent alcohol by polycondensation.

The divalent carboxylic acid component includes aromatic dicarboxylic acids, aliphatic dicarboxylic acids, and other dicarboxylic acids. Examples thereof include oxalic acid, succinic acid, adipic acid, sebacic acid, dimer acid, hexahydroterephthalic acid, phthalic acid, isophthalic acid, terephthalic acid, 2,6-naphthalenedicarboxylic acid, 2,7-naphthalenedicarboxylic acid, 1,5-naphthalenedicaroxylic acid, diphenyletherdicarboxylic acid, diphenoxyethane-4,4-dicarboxylic acid, diphenylsulfonedicarboxylic acid, glycolic acid, p-oxybenzoic acid, p-oxyethoxybenzoic acid, and the like. One or more selected from these bifunctional carboxylic acids are used as the divalent dicarboxylic acid component.

There are several other methods for polycondensation. The divalent carboxylic acids may be esterified with methyl alcohol or the like, and then may be polycondensed by removing alcohol. The polycondensed product is also obtainable by using the anhydrides of the divalent carboxylic acids. In these methods, the divalent carboxylic acid component is the esters or anhydrides of the dicarboxylic acids.

The dihydric alcohol component includes aromatic dialcohols, aliphatic dialcohols, and other dialcohols. Examples thereof include ethylene glycol, alkanediol represented by $HO(CH_2)_nOH$ (n represents an integer of from 3 to 10), isobutylene glycol, neopentylglycol, 1,4-dicyclohexanediol, 2,2-bis-4-hydroxyphenylpropane, hydroquinone, 1,5-dihydroxy-naphthalene, and 2,6-dihydroxynaphthalene, and the like. One or more selected from these alcohols are used as the dihydric alcohol component.

(Polyester Copolymer)

The polyester copolymer of the invention may be obtained by polycondensation of bifunctional monomers which have at least one functional group selected from an amino group ($—NH_2$), an imino group (>NH), an amido group (—CO—N<), and a sulfonic acid group ($—SO_2OH$) and can undergo polycondensation with a carboxyl group (—COOH) or a hydroxyl group (—OH). Here, as another copolymer-constituting unit for this polycondensation, all of bifunctional carboxylic acid compounds and dihydric alcohols used for polycondensation of the thermoplastic polyester resins can be used. Among these, polyester copolymers containing a monomer of polyethylene terephthalate and/or polyethylene naphthalate are preferable.

It is also preferable that at least one of monomers constituting the polyester copolymer of (2) is the same as one of the monomers constituting the thermoplastic polyester resins used in the invention.

In the polyester resin composition of the invention, the content ratio of the polyester copolymer of (2) to the layered silicate of (3) (explained later) is preferably from 50% to 500% by mass, more preferably from 70% to 400% by mass, and particularly preferably from 100% to 300% by mass.

It is necessary that the content ratio of the monomer having, as a functional group, at least one of an amino group, an imino group, an amido group, and a sulfonic acid group in the polyester copolymer of (2) falls in a range of 5 to 15 mol %. If the molar ratio is less than 5 mol %, an effect to promote kneading of a filler such as the layered silicate and to inhibit the thermal decomposition of the matrix resin (polyester) becomes insufficient, and accordingly highly uniform dispersibility cannot be achieved. On the other hand, if the molar ratio is more than 15 mol %, a polyester resin composition becomes insufficient in the properties such as mechanical strength, heat resistance, and barrier properties.

The content ratio of the monomer having, as a functional group, at least one of an amino group, an imino group, an amido group, and a sulfonic acid group in the aforementioned polyester copolymer of (2) falls preferably in a range of 5.5 to 12 mol %, and more preferably in a range of 6 to 9 mol %.

Examples of the monomer having, as a functional group, at least one of an amino group, an imino group, an amido group, and a sulfonic acid group include 5-sodium sulfoisophthalic acid (or its dimethyl ester), N,N'-bis(3-aminopropyl) piperazine, bis(aminocyclohexyl)methane, 2-aminoethylpiperazine, 2-aminopropylpiperazine, lauric acid diethanolamide, o-aminobenzylalcohol, m-xylenediamine, p-aminophenol, m-aminophenol, various aminophenols, p-phenylenediamine, m-phenylenediamine, various phenylenediamines, 4-amino-1-naphthol, 4-amino-4'-hydroxydiphenyl, 4-amino-4'-hydroxy-diphenylmethane, 4-amino-4'-hydroxydiphenylethane, 4-amino-4'-hydroxydiphenyl sulfone, 4-amino-4'-hydroxydiphenyl sulfide, 4,4'-diaminophenyl sulfide, 4,4'-diaminophenyl sulfone, and halogen-substituted products of these, alkyl-substituted products of these such as methyl-substituted products, and aryl-substituted products of these such as phenyl-substituted products. These monomers for copolymerization can be used singly or as mixtures of two or more thereof.

The monomer having, as a functional group, at least one of an amino group, an imino group, an amido group, and a sulfonic acid group may form a metal salt. The metal ions of monomers having a metal salt substituent include alkali metals such as lithium, sodium, potassium, and rubidium, alkaline earth metals such as beryllium, magnesium, calcium, and strontium, and aluminum, zinc, and the like. Of these, the alkali metals such as lithium, sodium, and potassium are preferred, and sodium is more preferred.

The content ratio of the monomer having, as a functional group, an amino group, an imino group, an amido group, and a sulfonic acid group in the total polyesters in the polyester resin composition is in a range of 1 to 5 mol %. The ratio less than 1 mol % results in difficult kneading and insufficient dispersibility. The ratio exceeding 5 mol % results in insufficient mechanical strength, heat resistance, and barrier properties of the resulting polyester resin composition.

The content ratio of the monomer having, as a functional group, an amino group, an imino group, an amido group, and a sulfonic acid group in the total polyesters is preferably in a range of 1.3 to 4.5 mol % and more preferably in a range of 1.5 to 4.0 mol % (Layered Silicate)

In the polyester resin composition of the invention, a layered silicate is filled as an inorganic filler in a polyester resin matrix. Filling of the layerd silicate, or particularly an organized swellable layerd silicate as described later, makes it possible to improve the mechanical strength, heat resistance, and oxygen barrier properties of the moldings and films made of the polyester resin composition.

As the layerd silicateused in the invention, swellable layered silicates are particularly preferable. Any swellable layerd silicatescan be appropriately used, and can be suitably selected from known swellable layerd silicates. Examples of the swellable layerd silicatesinclude smectite group clay minerals such as natural or synthetic hectorite, saponite, stevensite, beidellite, montmorillonite, nontronite, and bentonite, swelling mica group clay minerals such as Na-type tetrasilicic fluorine mica, Li-type tetrasilicic fluorine mica, Na-type fluorine taeniolite, and Li-type fluorine taeniolite, vermiculite, and mixtures of two or more thereof.

Commercially available layerd silicatesinclude Raponite XLG (Manufactured by Raport Co., England, Synthetic compound similar to hectorite), Raponite RD (Manufactured by Raport Co., England, Synthetic compound similar to hectorite), Thermavis (Manufactured by Henkel Co., Germany, Synthetic compound similar to hectorite), Smecton SA-1 (Manufactured by Kunimine Kogyo K.K., Compound similar to saponite), Bengel (Manufactured by Hojun Yoko K.K., Natural montmorillonite), Kunipia F (Manufactured by Kunimine Kogyo K.K., Natural montmorillonite), Biegum (Manufactured by Bunderbilt Co., Natural hectorite), Dimonite (Manufactured by Topy Industries, Ltd., Synthetic swelling mica), Somasif (Manufactured by Co-op Chemical Co. Ltd., Synthetic swelling mica), SWN (Manufactured by Co-op Chemical Co. Ltd., Synthetic smectite), SWF (Manufactured by Co-op Chemical Co., Ltd.), and the like.

The "swellable" means to have properties to swell when a solvent such as water, alcohol, or ether permeates through crystalline layers of the layerd silicates.

In the invention, it is preferred that the swellable layerd silicates are organized by an organizing agent and used in such a state. By substituting interlaminar inorganic ions of the layerd silicateswith organic ions, compatibility would be increased with resin components forming the matrix, particularly, the polyester copolymers containing the monomers having, as a functional group, at least one of an amino group, an imino group, an amido group, and a sulfonic acid group.

The organizing agent includes organic onium ions. Examples of the organic onium ions include ammonium ions, phosphonium ions, and sulfonium ions. Of these, ammonium ions and phosphonium ions are preferred, and phosphonium ions are particularly preferred in view of improvement in the heat resistance.

As the phosphonium ion, an ionic compound represented by the following general formula (1) is preferred.

General Formula (1)

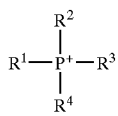

In general formula (1), $R^1$, $R^2$, $R^3$, and $R^4$ independently represent one selected from the group consisting of a hydrogen atom, an alkyl group having 1 to 20 carbon atoms, and a hydrocarbon group containing a carboxyl group, a hydroxyl group, a phenyl group, or an epoxy group. Here, a part of the hydrogen atoms of the alkyl group and the phenyl group can be replaced by halogen atoms, a hydroxyl group, a carboxyl group, and —COOR (R represents an alkyl group having 1 to 5 carbon atoms).

Examples of the phosphonium ions represented by general formula (1) include tetraethylphosphonium ion, triethylbenzylphophonium ion, tetrabutylphosphonium ion, tetraoctyl-phophonium ion, trimethyldecylphosphonium ion, trimethyl-dodecylphosphonium ion, trimethylhexadecylphosphonium ion, trimethyloctadecylphosphonium ion, tributylmethyl-phosphonium ion, tributyldodecylphosphonium ion, tributyl-hexadodecylphosphonium ion, tributyloctadecylphosphonium ion, tetrakis(hydroxymethyl)phosphonium ion, methyltriphenyl-phosphonium ion, ethyltriphenylphosphonium ion, 2-hydroxyethyltriphenylphosphonium ion, diphenyldioctylphophonium ion, triphenyloctadecylphosphonium ion, tetraphenylphosphonium ion and the like. Of these, tetraethylphosphonium ion, tetrabutylphosphonium ion, tetrakis(hydroxymethyl)phosphonium ion, ethyltriphenylphosphonium ion, and 2-hydroxyethyltriphenylphosphonium ion are particularly preferred.

Methods for organizing the swellable layerd silicatesinclude a method in which a swellable layerd silicateis dispersed into a solvent, a phosphonium ion represented by general formula (1) is added thereto, part or all of cations (Na, Li, etc.) present between crystal layers of the silicate undergo ion-exchange with the phosphonium ion, and thus the swellable layerd silicateis organized. However, the method is not particularly limited thereto. The solvent to be used may be water, methanol, ethanol, propanol, isopropyl alcohol, ethylene glycol, 1,4-butanediol, and the like.

The content of the layerd silicates(particularly organized swellable layerd silicates) of the invention is preferably from 0.5% to 30% by mass and more preferably from 3% to 20% by mass to the total mass of the polyester resin composition. If the content is less than 0.5% by mass, the reinforcing effect may be insufficient in spite of addition of the layered silicates. On the other hand, if the content exceeds 30% by mass, dispersibility and transparency of the inorganic fillers such as the layered silicates may decrease, or the mechanical strength of moldings and films formed with the polyester resin composition may be insufficient (i.e. fragile).
Antioxidant An antioxidant is added to the polyester resin composition of the invention in order to inhibit thermal decomposition or hydrolysis at high temperatures during molding processing. The antioxidants to be used may be one or more selected from phenolic antioxidants, thioether antioxidants, phosphorus antioxidants, hindered phenolic antioxidants, and other known antioxidants or pyrolysis retardants. However, the antioxidants to be used in the invention are not particularly limited thereto.

Examples of the antioxidants include 6-ethoxy-1-phenyl-2,2,4-trimethyl-1,2-dihydroquinoline, 6-ethoxy-1-octyl-2,2, 4-trimethyl-1,2-dihydroquinoline, 6-ethoxy-1-phenyl-2,2,4-trimethyl-1,2,3,4-tetrahydroquinoline, 6-ethoxy-1-octyl-2,2, 4-trimethyl-1,2,3,4tetrahydroquinoline, nickel cyclohexanoate, 2,2-bis(4hydroxyphenyl)propane, 1,1-bis (4-hydroxyphenyl)-2-ethylhexane, 2-methyl-4-methoxy-diphenylamine, 1-methyl-2-phenylindole, and the like.

Furthermore, antioxidants recited in the following documents may also be used. The documents are as follows: EP-A Nos. 223739, 309401, 309402, 310551, 310552, and 459416, GP-A No.3,435,443, JP-A Nos.54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, 63-163351, 63-203372, 63-224989, 63-251282, 63-267594, and 63-182484, JP-A Nos.1-239282, 2-262654, 2-71262, 3-121449, 6-135154, 6-135153, 5-61166, 5-119449, 7-17138, 7-17145, and 7-25162, JP-B Nos.48-43295 and 48-33212, and U.S. Pat. Nos. 4,814,262 and 4,980,275.

Examples of commercially available antioxidants include "Sumirizer BHT" (2,6-di-t-butyl-4-methylphenol) manufactured by Sumitomo Chemical Co., Ltd., "Irganox 1010" (tetrakis[methylene-3-(3',5'-di-t-butyl-4-hydroxyphenol)-propionate] methane) manufactured by Ciba Geigy Ltd., "Sumirizer TDP" (pentaerythritoltetrakis(3-laurylthioprominate)) manufactured by Sumitomo Chemical Co., Ltd., "Irgafos 168" (tris(2,4-di-t-butylphenyl) phosphite) manufactured by Ciba Geigy Ltd., and the like.

In the polyester resin composition of the invention, the content of the antioxidants in the polyester resin composition is in a range of 0.01% to 1.0% by mass. If the content is less than 0.01% by mass, the effect of inhibiting thermal decomposition during molding processing may be insufficient. A content exceeding 1.0% by mass should also be avoided since excess antioxidants are unnecessary and may cause problems such as decomposition of the polyester resin or decrease in the mechanical strength and heat resistance. The content of the antioxidants in the polyester resin composition is preferably in a range of 0.05% to 0.9% by mass and more preferably in a range of 0.1% to 0.8% by mass.

KNEADING AND DISPERSION

The polyester resin composition of the invention can be easily prepared by kneading the materials in a melted form, and the procedure of kneading and the means adopted are not particularly limited. It is preferred, however, that the polyester copolymer and the layerd silicate are kneaded beforehand, and then the thermoplastic polyester resin is added thereto and further kneaded. Examples of mixing kneaders used for the melting and kneading, which are not particularly limited, include a twin-screw extruder, a double rotor-type continuous kneader, a stone mill-type continuous kneader where kneading is conducted between a rotary disk and a fixed disk, a Banbury mixer, a Kneaders, a roll mill, and the like.

The polyester resin composition of the invention can be used for a variety of purposes such as moldings, films for optical materials, substrates for magnetic materials, and substrates for image forming layers.

EXAMPLES

The invention is illustrated below by using examples, but these examples should not be construed to limit the scope of the invention. "Parts" in the examples indicate "mass parts" unless otherwise noted.

Example 1
(Preparation of Organized Swellable Layered Silicate)

5 kilograms of "SWN" (synthetic smectite) manufactured by Co-op Chemical Co., Ltd. were dispersed into 50 liters of a water-methanol mixed solvent, and then 5 kilograms of trimethylhexadecylsulphonium bromide were mixed and stirred to obtain a swellable layerd silicateorganized with trimethylhexadecylsulphonium ion.
(Synthesis of Polyester Copolymer)

Polycondensation was carried out by using 45 mol % of terephthalic acid as a dicarboxylic acid component, 45 mol % of ethylene glycol as a diol component, 5 mol % of o-aminobenzyl alcohol as a monomer having an amino group as a functional group, and 5 mol % of dimethyl 5-sodium sulfoisophthalate as a monomer having a sulfonic acid group as a functional group. As a result, obtained was a polyester copolymer containing the monomer having an amino group and the monomer having a sulfonic acid group at a ratio of 10 mol % in total. The intrinsic viscosity of the resulting polyester copolymer was 0.61.

Preparation of Polyester Resin Composition 50 parts of polyethylene terephthalate (PET) having an intrinsic viscosity of 0.65 as the thermoplastic polyester resin, 39.5 parts of the aforementioned polyester copolymer, 10 parts of the aforementioned organized layerd silicate, and 0.25 parts each of "Irgafos 168" and "Irganox 1010" manufactured by Ciba-Geigy Ltd. as antioxidants were blended. The blended materials were melted and kneaded in a twin-screw extruder "TEM-37" produced by Toshiba Machine Co., Ltd., so as to obtain a polyester resin composition of the invention. The melting and kneading were carried out at a temperature of 280° C. at a screw rotation speed of 500 rpm.

Example 2

A polyester resin composition was prepared in the same manner as Example 1 except that the polycondensation was carried out without use of the monomer having a sulfonic acid group (dimethyl 5-sodium sulfoisophthalate) to obtain a polyester copolymer.

Example 3

A polyester resin composition was prepared in the same manner as Example 1 except that the polycondensation was carried out without use of the monomer having an amino group (o-aminobenzyl alcohol) to obtain a polyester copolymer.

Comparative Example 1

A polyester resin composition was prepared in the same manner as Example 2 except that the amount of the thermoplastic polyester resin blended was 80 parts instead of 50 parts and the amount of the polyester copolymer blended was 9.5 parts instead of 39.5 parts.

Comparative Example 2

A polyester resin composition was prepared in the same manner as Example 2 except that the each amount of the antioxidants ("Irgafos 168" and "Irganox 1010") blended was 0.004 parts instead of 0.25 part.
(Preparation of "Non-Reinforced Resin" Composition)

The "non-reinforced resin" composition for the evaluation test of Example 1 was prepared in the same manner as Example 1 except that the organized layerd silicateand the antioxidant were omitted in the production process thereof. In other words, the "non-reinforced resin" composition of Example 1 was produced by melting and kneading 50 parts of thermoplastic polyester resin (polyethylene terephthalate (PET)) and 39.5 parts of the polyester copolymer.

With respect to Examples 2 and 3 and Comparative Examples 1 and 2, the "non-reinforced resin" compositions for the evaluation tests of Examples 2 and 3 and Comparative Examples 1 and 2 were also prepared in a similar manner by omitting the organized layerd silicateand the antioxidant in the production process.
(Evaluation Tests)

The following evaluation tests were carried out to the polyester resin compositions obtained in the Examples and Comparative Examples. Results are shown in the following Table 1.
(1) Evaluation of State of Dispersion The diffraction peak of a (001) plane of the layerd silicateswas measured by wide angle X-ray diffraction. The state of dispersion was also observed on a transmission electron microscope. Results of the measurement and the observation are evaluated based on the following criteria as follows:

oo: No diffraction peak existed and no aggregated particles were observed.

o: No diffraction peak existed and aggregated particles observed were 5% or less.

Δ: No diffraction peak existed and aggregated particles observed were less than 30%.

×: A diffraction peak existed and aggregated particles observed were 30% or more.
(2) Tensile Modulus of Elasticity Test specimens of 1 mm (thickness)×10 mm (width) were prepared from polyester resin compositions obtained in the Examples and Comparative Examples and "non-reinforced resin" compositions. A tensile test was carried out by using a tensile testing machine (Produced by Toyo Seiki Seisakusho K.K.) to measure the modulus of elasticity. The improvement ratio (%) of the modulus of elasticity of each polyester resin composition compared to the modulus of elasticity of the specimen of the corresponding "non-reinforced resin" composition was used as an index for evaluation. Criteria for the evaluation are as follows:

oo: The improvement ratio when compared to the non-reinforced resin specimen was 50% or more.

o: The improvement ratio when compared to the non-reinforced resin specimen was 20% or more and less than 50%.

Δ: The improvement ratio when compared to the non-reinforced resin specimen was 5% or more and less than 20%. : The improvement ratio when compared to the non-reinforced resin specimen was less than 5% or below 0% (no improvement).
(3) Oxygen Barrier Properties The oxygen permeability of polyester resin compositions obtained in the Examples and Comparative Examples and that of "non-reinforced resin" compositions were measured by using an instrument "OX-TRAN 10/50A" produced by Mocon, Inc. The degree of the oxygen permeability of each polyester resin composition compared to the oxygen permeability of the corresponding "non-reinforced resin" composition was used as an index for evaluation. Criteria for evaluation are as follows:

oo: The degree of oxygen permeability when compared to the non-reinforced resin composition was 1/10 or less.

o: The degree of oxygen permeability when compared to the non-reinforced resin composition is more than 1/10 and 1/5 or less.

Δ: The degree of oxygen permeability when compared to the non-reinforced resin composition is more than 1/5 and 1/2 or less.

x: The degree of oxygen permeability when compared to the non-reinforced resin composition is more than ½.

(4) Average Molecular Weight

The organized layerd silicatewas separated and removed from polyester resin compositions obtained in the Examples and the Comparative Examples. Molecular weight distribution of each polyester resin component was measured by GPC to find the number average molecular weight. The molecular weight ratio (%) of the number average molecular weight of each polyester resin component compared to the number average molecular weight of the corresponding "non-reinforced resin" composition was used as an index for the evaluation. Criteria for the evaluation are as follows:

oo: The molecular weight ratio when compared to the non-reinforced resin composition was 95% or more.

o: The molecular weight ratio when compared to the non-reinforced resin composition was 90% or more and less than 95%.

Δ: The molecular weight ratio when compared to the non-reinforced resin composition was 70% or more and less than 90%.

x: The molecular weight ratio when compared to the non-reinforced resin composition was less than 70%.

(5) Transparency

Sheets having a thickness of 0.5 mm were prepared from polyester resin compositions obtained in the Examples and Comparative Examples and "non-reinforced resin" compositions. The light transmittance was measured by using a turbidimeter "NDH-1001DP" produced by Nippon Denshoku Kogyo K.K. The ratio (%) of the light transmittance of each polyester resin sheet compared to the light transmittance of the sheet of the corresponding "non-reinforced resin" composition was used as an index for evaluation. Criteria for the evaluation are as follows:

oo: The ratio when compared to the non-reinforced resin sheet was 95% or more.

o: The ratio when compared to the non-reinforced resin sheet was 90% or more and less than 95%.

Δ: The ratio when compared to the non-reinforced resin sheet was 70% or more and less than 90%.

x: The ratio when compared to the non-reinforced resin sheet was less than 70%.

TABLE 1

| Resin Composition | State of Dispersion | Modulus in Tension | Barrier Properties | Average Molecular Weight | Transparency |
| --- | --- | --- | --- | --- | --- |
| Example 1 | oo | oo | oo | oo | oo |
| Example 2 | oo | oo | oo | oo | oo |
| Example 3 | oo | oo | oo | oo | oo |
| Comparative Example 1 | Δ | Δ | Δ | oo | Δ |
| Comparative Example 2 | o | Δ | o | Δ | o |

As shown in Table 1, the polyester resin compositions (Examples 1 to 3) of the invention are superior in dispersibility of layerd silicates, and improved in tensile modulus of elasticity (mechanical strength). The results of the number average molecular weight shows that thermal decomposition (hydrolysis) would be inhibited. Simultaneously, the heat resistance was also improved. Moreover, the polyester resin compositions of the invention are excellent in oxygen-barrier properties and good in transparency.

On the other hand, the polyester resin compositions of Comparative Examples 1 and 2 are inferior in compatibility and poor in dispersibility of layerd silicates. The results show polyester resin compositions of Comparative Examples 1 and 2 are also inferior in various other characteristics such as the mechanical strength and heat resistance. Particularly, in Comparative Example 2 where the antioxidants are contained only in small amounts, the decrease in the number average molecular weight proves the occurrence of the thermal decomposition (hydrolysis).

The invention provides polyester resin compositions that are prepared by highly uniformly dispersing the layerd silicateof nanometer order. The provided compositions particularly show high heat resistance without undergoing hydrolysis during molding processing. Moreover, they have high transparency with a low haze, high mechanical strength, dimensional stability, and oxygen-barrier properties.

What is claimed is:

1. A polyester resin composition comprising:

a thermoplastic polyester resin, a polyester copolymer containing a monomer having at least one of an amino group, an imino group, an amido group, and a sulfonic acid group, a layerd silicate, and an antioxidant, wherein:

the monomer having at least one of an amino group, an imino group, an amido group, and a sulfonic acid group is contained in the polyester copolymer in an amount of 5 to 15 mol %;

the monomer having at least one of an amino group, an imino group, an amido group, and a sulfonic acid group is contained in the polyester resin composition in an amount of 1 to 5 mol % based on a total polyester content of the polyester resin composition; and the antioxidant is contained in the polyester resin composition in an amount of 0.01% to 1.0% by mass.

2. The polyester resin composition of claim 1 wherein the polyester copolymer contains at least one of ethylene terephthalate and naphthalate as constituent unit.

3. The polyester resin composition of claim 1, wherein at least one of monomers constituting the polyester copolymer is the same as a monomer constituting the thermoplastic polyester resin.

4. The polyester resin composition of claim 1, wherein a content ratio of the polyester copolymer to the layerd silicateis from 50% to 500% by mass.

5. The polyester resin composition of claim 1, wherein a content ratio of the polyester copolymer to the layerd silicateis from 70% to 400% by mass.

6. The polyester resin composition of claim 1, wherein a content ratio of the polyester copolymer to the layerd silicateis from 100% to 300% by mass.

7. The polyester resin composition of claim 1, wherein the monomer having at least one of an amino group, an imino group, an amido group, and a sulfonic acid group is contained in the polyester copolymer in an amount of 5.5 to 12 mol %.

8. The polyester resin composition of claim 1, wherein the monomer having at least one of an amino group, an imino group, an amido group, and a sulfonic acid group is contained in the polyester copolymer in an amount of 6 to 9 mol %.

9. The polyester resin composition of claim 1, wherein the monomer having at least one of an amino group, an imino group, an amido group, and a sulfonic acid group is contained in the polyester resin composition in an amount of 1.3 to 4.5 mol % based on a total polyester content of the polyester resin composition.

10. The polyester resin composition of claim 1, wherein the monomer having at least one of an amino group, an imino group, an amido group, and a sulfonic acid group is contained in the polyester resin composition in an amount of 1.5 to 4.0 mol % based on a total polyester content of the polyester resin composition.

11. The polyester resin composition of claim 1, wherein the layered silicate is contained in the polyester resin composition in an amount of 0.5% to 30% by mass based on a total mass of the polyester resin composition.

12. The polyester resin composition of claim 1, wherein the layered silicate is contained in the polyester resin composition in an amount of 3% to 20% by mass based on a total mass of the polyester resin composition.

13. The polyester resin composition of claim 1, wherein the layered silicate is a swellable layerd silicateorganized by an organizing agent.

14. The polyester resin composition of claim 1, wherein the antioxidant is contained in the polyester resin composition in an amount of 0.05% to 0.9% by mass.

15. The polyester resin composition of claim 1, wherein the antioxidant is contained in the polyester resin composition in an amount of 0. 1% to 0.8% by mass.

* * * * *